Nov. 9, 1965
W. G. CORNELL ETAL
3,216,455
HIGH PERFORMANCE FLUIDYNAMIC COMPONENT
Filed Dec. 5, 1961
2 Sheets-Sheet 1
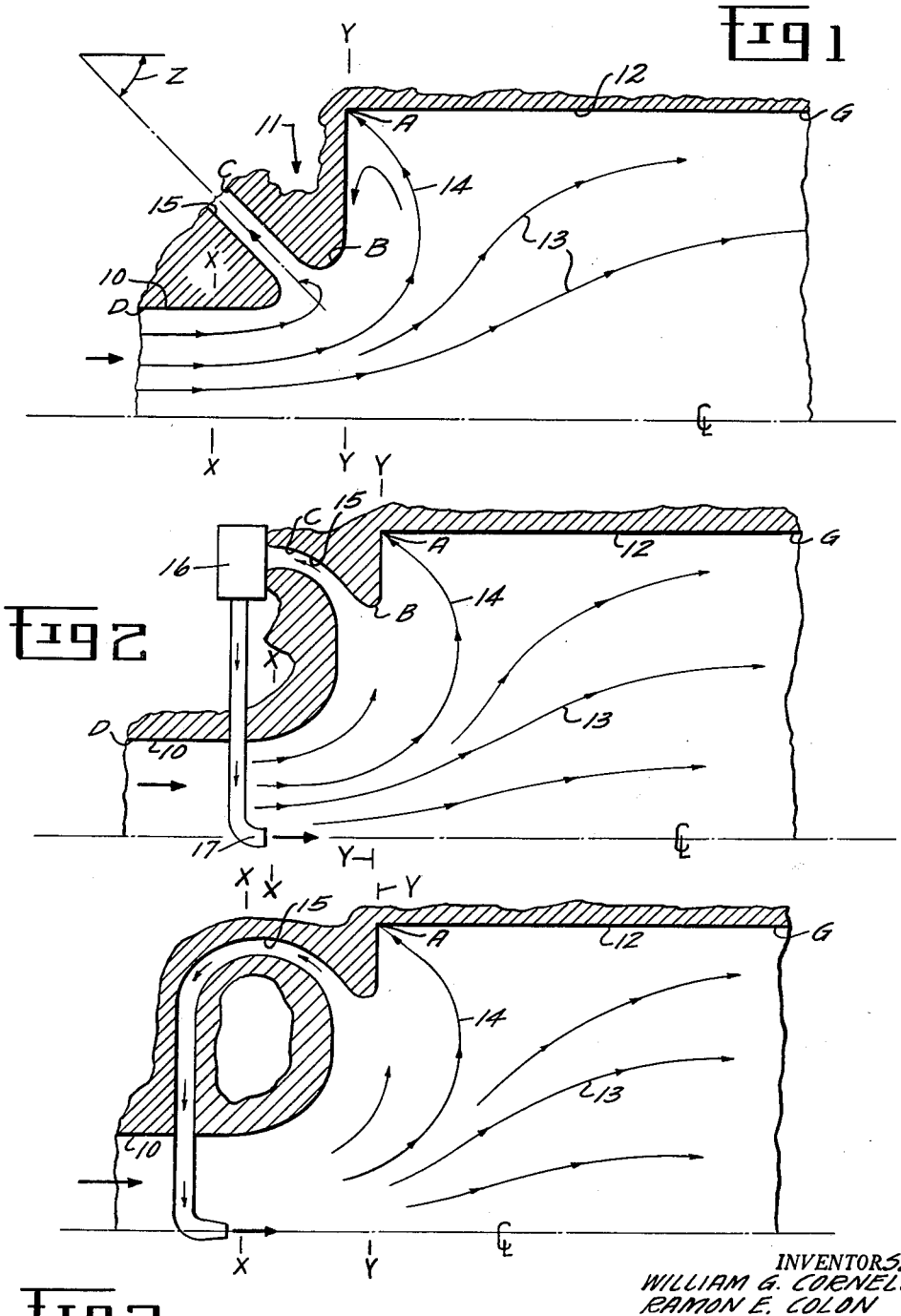
INVENTORS.
WILLIAM G. CORNELL
RAMON E. COLON
FRIEDRICH S. WEINIG
BERNARD F. SHATTUCK
By John F. Cullen
ATTORNEY INVENTORS.
WILLIAM G. CORNELL
RAMON E. COLON
FRIEDRICH S. WEINIG
BERNARD F. SHATTUCK

ATTORNEY

United States Patent Office 3,216,455
Patented Nov. 9, 1965

3,216,455
HIGH PERFORMANCE FLUIDYNAMIC
COMPONENT
William G. Cornell, Cincinnati, Ohio, Ramon Edward Colon, Newport News, Va., Friedrich S. Weinig, Leinsweiler uber Landau, Pfalz, Germany, and Bernard Freshney Shattuck, Marblehead, Mass., assignors to General Electric Company, a corporation of New York
Filed Dec. 5, 1961, Ser. No. 157,154
7 Claims. (Cl. 138—39)

The present invention relates to a high performance fluidynamic component designed for controlled flow on all solid surfaces and which component may be a body immersed in a flow or a channel containing a flow. More particularly, it relates to fluidynamic diffusers of the type that may advantageously be used in aircraft jet engines but is not limited to such use.

While the invention will be described particularly in connection with aerodynamics, it should be understood that as herein disclosed it is equally applicable to liquids as well as air or other gases or mixtures of both liquids and gases. For convenience, the invention will be described in connection with aerodynamics as applied to diffusers. It should be understood that the invention is applicable to configurations other than a diffuser which is described for illustration only. The invention is applicable to immersed bodies such as single airfoils, compressor or turbine blades and other ducting components or combinations of ducting components and immersed bodies and the term fluidynamic body as used herein is intended to cover such modifications.

The design of high performance aerodynamic components for both internal and external flow is made difficult due to the action of the boundary layer on the solid surfaces. Internal flow components may include diffusers as well as other ducting elements, and external flow components may include airfoils such as compressor or turbine blades or single airfoils such as aircraft wing profiles as well as outer surfaces of bodies movable in fluids. The boundary layer may be defined as a relatively thin layer of fluid adjacent to the solid surfaces, to which layer is confined the region where fluid viscosity is important in the case of fluids of small viscosity such as air, combustion products, water, and the like. The boundary layer causes little trouble to the designer on solid surfaces along which the static pressure is falling and hence the velocity is rising or there is an accelerating flow in the streamwise direction. However, when static pressure is rising and the velocity is falling creating decelerating flow or diffusion in the streamwise direction on a solid surface, the boundary layer causes trouble. The reason for this trouble is the combined action of the static pressure gradient and the viscous shear of the solid surface in retarding the fluid in the boundary layer. As an example, if we consider a small "piece" of the boundary layer fluid moving in the direction of the fluid flow, there are certain forces that react on this "piece" of fluid. In a diffuser, which may be thought of as the reverse of a nozzle, the downstream portion is normally at a high pressure, low velocity condition. The small "piece" of boundary layer fluid has an inertia force because of its movement downstream. This inertia force is balanced by a pressure force (because of the higher pressure downstream in a diffuser) which is pushing backward from the region of high pressure to the region of low pressure. In addition there is a friction force on the "piece" of fluid along the wall or adjacent fluid acting in a direction to oppose motion. Thus, inertia force which tends to drag the boundary layer along is opposed by two forces, the pressure force and the friction force. If either of these latter forces gets too large, the small piece of boundary layer will come to rest and start in the reverse direction. When this happens a small vortex or tornado is set up with back-flow along the wall and outside air skirts this and creates undesirable flow conditions and, in the language of fluidynamics, separation takes place. Thus, the retarded boundary layer thickens as it flows along the solid surface and will come to rest and separate from the surface if the unfavorable static pressure gradient combined with friction is large enough. Boundary layer separation leads to large, low velocity regions of eddying flow and large losses. In the case of single airfoils, lift is lost and drag increases greatly, in the case of compressor or turbine blade airfoils, lift is lost, drag increases and efficiency is lost, and in the case of outer surfaces of bodies, separation of the adjacent fluid flow may result in buffeting loads or drag increase so that structural integrity as well as efficiency is adversely affected. In the case of diffusers, long pieces of hardware are required with a gradual change in cross-section resulting in large and heavier components, both of which are undesirable in aircraft use. In the case of the diffuser, the difficulty arises principally because the fluid is trying to go "up hill" in pressure and the inevitable result is that separation occurs. Thus, the rate of pressure rise is an important parameter and the higher the rate, the easier separation occurs. As a result, in the flow along solid walls, wherever the fluid undergoes deceleration or encounters a pressure gradient in the direction of the stream flow such that static pressure increases along the flow, difficulty can be expected in the form of separation. The conditions just described are well known and, as a result, attempts have been made to avoid this separation.

Various principles have been devised in order to help in the problem of avoiding boundary layer separation. The first of these involves the various well known boundary control devices going back to the slotted wing which was made up of two airfoils with a slot between to bleed some of the flow from the concave surface into the slot and blow it out tangentially to the upper or convex surface of the wing to put more kinetic energy or velocity into the boundary layer. The increase in velocity counteracted the pressure gradient and the friction force and is a true example of boundary layer control. Another method used was the rotating element in a wing to impart kinetic energy to the boundary layer and thus help it along in the same manner as the slotted wing. Both of these concepts are aimed at energizing the boundary layer by the addition of kinetic energy and thus helping the separation problem by overcoming the friction force and the pressure force so that there is no tendency towards separation. However, separation on wings still occurs at high angles of attack and the use of the two devices just mentioned merely permits higher angles of attack before separation occurs. The use of similar devices may be imagined in diffusers and other ducting components to inhibit separation.

The second principle of boundary layer control is the removal of low energy fluid of the boundary layer by suction which is well known in many applications. Boundary layer control can be either by suction or by blowing. Both of these methods are directed to controlling the boundary layer by the addition of energy to remove the pressure gradient or by actual removal of the boundary layer by suction so it is not there.

Thus, boundary layer control devices are aimed directly at the boundary layer per se and not at the adverse pressure gradient which causes the boundary layer to react unfavorably. In other words they are not directed to the cause of the undesirable effect, but are directed to correct the effect after it has occurred.

Another concept for high performance aerodynamic components is the so called laminar-flow wing developed many years ago. The principle in this aims directly at the adverse pressure gradient rather than the subsequent boundary layer misbehavior. This wing was designed by theory and experiment to produce a convex surface static pressure distribtuion without the traditional low minimum near the leading edge and with a constant or slight decreasing static pressure from the leading edge low pressure point back to a point aft of the mid-point position followed by a sharp static pressure increase to the trailing edge. The principle was to maintain the convex surface boundary layer in a thin laminar (as contrasted to turbulent) condition all the way back to the sudden diffusion. During the sudden diffusion the boundary layer separates but adhesion is maintained over most of the wing. This tremendous development gave an aircraft wing having about one third the drag of the best previous wings at about the same lift level. This development was restricted to single airfoils for aircraft wings, with flight levels of turbulence and no removal of flow through the surface.

The main object of the present invention is to provide an aerodynamic or, more broadly, a fluidynamic component such as a diffuser which avoids any adverse pressure gradient along the flow on solid walls. Adverse pressure gradients are restricted to the free stream of fluid away from solid walls in which friction forces are negligible in flows with small fluid viscosity.

Another object is to provide such a component with a configuration such that the pressure distribution along the solid walls is such that the pressure is at least constant, if not decreasing in the direction of flow.

Another object is to provide such a component which is directed to the removal of the conditions which adversely affect the boundary layer.

Briefly stated, the invention is directed to providing a fluidyamic component such as a diffuser wherein the wall portions or solid surfaces are formed such as to have not less than constant velocity flow distribution along the outer edge of the boundary layer to avoid the flow separation at all times. The particular flow distribution on the component surfaces may be obtained by known design methods. It is to be understood that the diffuser is only an example of the general fluidynamic component discussed herein. Any ducting component, such as a diffuser, any body immersed in flow, such as a single airfoil or compressor or turbine airfoil, or any combination of ducting components and immersed bodies may be considered in this manner.

While the specification concludes with claims particularly pointing out and distinctly claiming the subject matter which we regard as our invention, it is believed the invention will be better understood from the following description taken in connection with the accompanying drawing in which:

FIGURE 1 is a partial schematic cross-sectional view of a diffuser;

FIGURE 2 is a view similar to FIGURE 1 showing reintroduction of the bled flow;

FIGURE 3 is a view similar to FIGURE 1 showing reintroduction in a self pumping arrangement;

Figure 4:
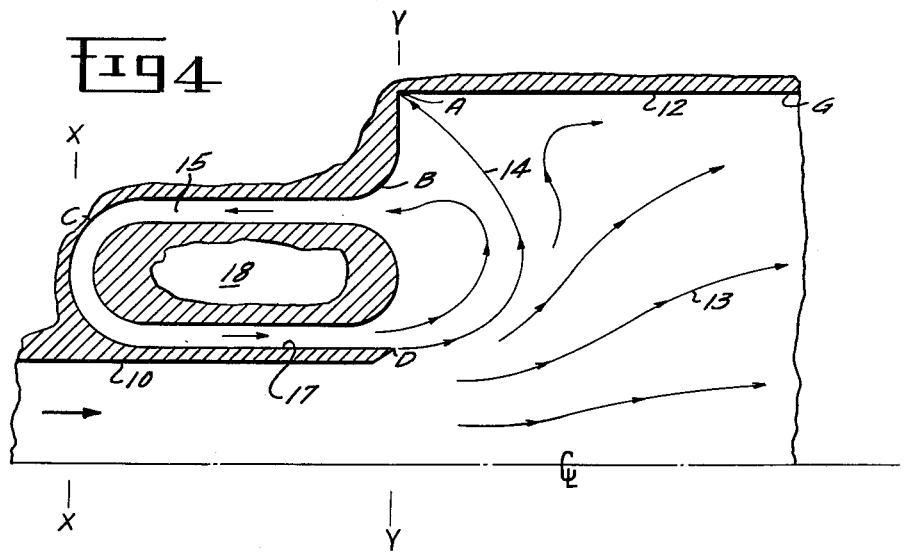
FIGURE 4 is a view similar to FIGURE 1 showing a reintroduction of the bled flow in a modified self pumping arrangement; and, FIGURE 5 is a similar view of still another modified form of self pumping arrangement.

In the present invention, we intend to eliminate all of the adverse pressure gradients on solid walls and do not concern ourselves with the boundary layer. By this invention it is possible to design mathematically exact shapes of solid surfaces to eliminate the need for any adverse pressure gradients. It is to be noted that this is completely different from the conventional sucking or blowing boundary layer control. In the present invention there are bleed openings through which small predetermined amounts of flow are removed and the boundary layer will, of necessity, go with it. The fact that the boundary layer goes is merely incidental since it happens to be in the way. This is definitely not a form of boundary layer control of the energizing type or the suction type defined above. Thus, separation is avoided by the removal of a predetermined portion of the main flow which may be dumped elsewhere or reintroduced into the main flow at an upstream or other position.

Referring first to FIGURE 1, there is shown a partial view of a diffuser consisting of a walled passage confining the fluid and employing the instant invention. The diffuser is symmetrical about the center line ₵ and only half is shown. The diffuser is formed of non-planar contiguous surfaces such as an upstream portion 10, a convex curved wall transition portion generally indicated at 11 and formed with at least one lobe (two being shown in FIG. 1) between the vertical lines X—X and Y—Y and a connected larger straight wall downstream portion 12. Since we have chosen as an example a diffuser, the flow cross-sectional area thus increases from portion 10 through the transition portion 11 to the larger downstream portion 12. For a time-steady flow the main fluid will follow the path of streamlines (fluid particle paths) 13 of which several are indicated. Since some of the main flow fluid is going to be withdrawn through a bleed duct forming an integral part of the transition portion as shown and as will be explained, there is a dividing streamline 14 which is terminated at the corner point indicated as A. This will occur as designed where a corner is provided as in the reference figure. The tangent to a streamline has the direction of the velocity vector at any point on the streamline. This line 14 is called the dividing streamline since all the flow between it and bleed duct means 15, which is provided in the transition portion 11, eventually passes out the duct 15 whereas that to the right of the dividing line is the actual diffused flow. The flow just illustrated is the desirable condition of flow in such a diffuser. The downstream portion 12 is merely a straight wall and the bleed duct 15 makes an angle Z with wall 12 as shown and this angle may vary between 0 and 360 degrees. The portion of the wall surface 10 to 15 which is a lobe is designed as a constant velocity wall in a smooth curve as shown and therefore has a constant pressure along the wall. Thus, there is no deceleration on it and the boundary layer does not separate. It should be noted that the provision of such a wall surface 10 to 15 may be designed mathematically, including the specification of the angle Z, and the shape computed to provide the constant pressure and constant velocity flow distribution on the wall. Further, the wall, starting at the corner A and forming part of the duct 15, has a particular velocity distribution in that the velocity from A to a certain point B is increasing since it is designed to do that. The wall from A to B is a flat wall. From B to C the wall curves smoothly because the velocity is designed to be at least constant and the boundary layer still does not separate. Similarly, on the wall surface D to numeral 15, as previously mentioned and forming another lobe in FIG. 1, there is at least constant velocity. It is to be noted that an increasing or a constant velocity flow distribution is desired on this smoothly curved wall and this reference to velocity pertains to the velocity of the fluid at the edge of the boundary layer or at the dividing line between the boundary layer and the main fluid flow. While acceleration is the desired condition which means an increasing velocity, it will be appreciated that at least constant velocity as well as increasing velocity is desirable to prevent separation and a decreasing velocity is to be avoided whenever possible. The one remaining wall A to G is a flat wall connected with the transition portion and thereby designed so that the velocity is always increasing so again there is no problem of fluid separation. By noting the position of streamlines 13 it can be seen that the passage between the wall A to G and the adjacent streamline 13 is pinching down the fluid adjacent to the wall as it progresses in the downstream direction. In the same manner a pinching effect occurs along the wall A to B as seen on FIGURE 1. Therefore, it can be seen that these walls are designed for acceleration (at least constant velocity) and the diffusion is kept out in the free stream away from the walls. It can be seen that the tube of fluid between the center line and the adjacent streamline 13 is widening out in the downstream direction thus all the diffusion is out in the middle of the passage where there is no wall and thus no boundary layer. This arrangement then merely keeps the diffusion away from the wall. Thus, in the figure just described the diffuser is designed to have a bleed duct with a surface 10 upstream designed to have at least a constant velocity and a downstream portion 12 designed to have an increasing velocity (acceleration) so that diffusion takes place centrally in the diffuser as indicated and the boundary layer problems simply do not occur. In other words, all the walls are designed to have at least a constant velocity flow distribution configuration to provide the diffuser of the type described.

In order to design such structure the theory of the steady, incompressible flow of a perfect (non-viscous) fluid which is free of body forces and which is in potential flow can be used and such theory is a well known mathematical theory for the design of such structure. In particular, the well known hodograph method may be employed.

In the hodograph method, one prescribes desired velocity distributions along walls of qualitatively known shapes and quantitatively determines the required wall shapes. Choosing a ratio of upstream to downstream area of the diffuser and a predetermined bleed duct angle Z, the exact mathematical shapes of all walls can be obtained as an integral design, as well as the amount of bleed flow required. This can be done for any value of angle Z so that the most appropriate angle for a given case can be chosen. The method in the instant invention can be applied to either "two dimensional" diffusers in which flow in parallel planes is the same or to "axially symmetric" diffusers in which flow in planes containing the diffuser axis is the same.

The discussion with reference to FIGURE 1 merely illustrates the removal of the fluid to bleed duct 15 to achieve the flow distribution just described.

In practice, to assure that the flow is bled in the transition portion as previously described, it may be desirable to provide a flow removal means such as a pump or auxiliary device 16 as shown in FIGURE 2 to forcefully remove the fluid. In such an application the flow may be extracted through the angled bleed duct 15 by pump 16 and may be reintroduced into the main flow at another location such as in the upstream portion ahead of the bleed duct as indicated at 17 which may be on the center line ₵ as shown or not, as the case may be. The reintroduced fluid is put into the main flow at some suitable velocity and location so as to minimize the disturbance to the main flow.

FIGURE 3, which is a two-lobed device, illustrates a similar modification wherein a self pumping arrangement is employed in which angled duct 15 is taken off the transition portion and the fluid is reintroduced into the main flow as in FIGURE 2, but no pump is required. Such a configuration might be used wherein the reintroduction is arranged as shown to create an ejector system so that the main flow actually does the pumping. Such an ejector or aspirator form permits the simplification of disposing of pump 16.

A further modification of this self pumping arrangement as applied to the structure just described, is illustrated as a two-lobed device in FIGURE 4. As previously described in connection with the structure of FIGURES 1–3, the predetermined angle Z of duct 15 may vary from 0 to 360 degrees and is shown in FIGURES 1–3 at approximately 45 degrees. As shown in FIGURE 4, the angle Z is at 0 degrees and the bleed duct 15 is smoothly curved from upstream into the duct which is parallel to the downstream wall portion 12. In this self pumping modification, the corner A of the dividing streamline 14 is still maintained at A and the bled fluid is reintroduced at 17 in the transition portion between the vertical lines X—X and Y—Y.

Figure 5:
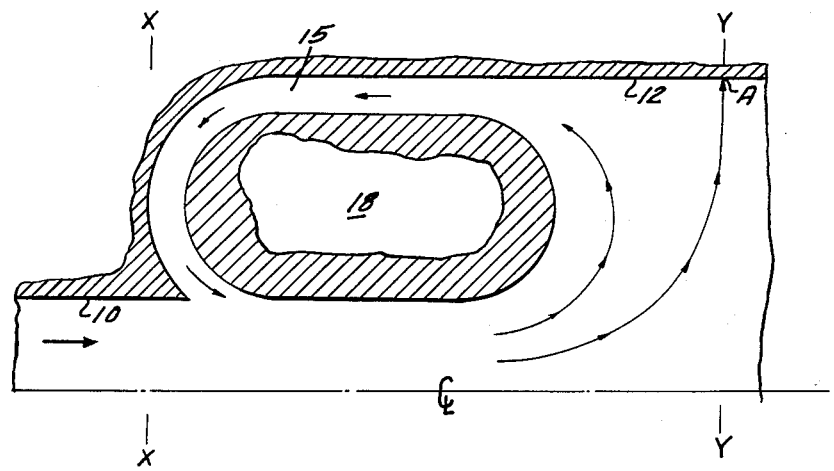

A further single lobe modification is illustrated at FIGURE 5. In this figure, the corner at A has been eliminated so that the bleed duct 15 is now parallel to and a continuation of the downstream wall portion 12 and the angle Z is now 0 degrees. Thus, no corners are presented and there is merely a flat wall. In this modification the point A is on a flat wall and not a corner. The particular value of this modification is that in case of off-design operation or errors of design, it is not critical that the flow dividing point fall exactly on the corner as in the previous modifications. Such a modification may reintroduce the bleed fluid in the transition section in the manner shown in FIGURE 5 or in a parallel passage as shown at 17 in FIGURE 4. Again in both FIGURES 4 and 5 the central member 18 is designed with at least constant velocity flow distribution configuration walls curving smoothly into the bleed duct whereas the straight wall portions are designed preferably for accelerating flow distribution. In either case pumping means may be inserted within the bleed duct to assist the removal of the predetermined amount of main flow in order to achieve the results desired.

It can be seen that the structure disclosed herein is a quantitative integral design as opposed to the qualitative boundary layer control concept. In other words, in boundary layer control normally an undetermined quantity is sucked out of the fluid or additional fluid blown into the main fluid to obtain the desired results. In the quantitative analysis applied to the instant structure, the integral design of all the wall surfaces by the invention herein disclosed, means that a particular shape is created according to the laws of fluidynamics to provide a contour and determine exactly how much flow is bled for the particular structure considered. The herein mentioned hodograph flow calculation method is merely based on a picture of the velocity distribution which exists in the flow and is one of the known methods by which the structure may be designed to provide the characteristics desired.

While we have hereinbefore described a preferred form of our invention, obviously many modifications and variations of the present invention are possible in the light of the above teachings. For example, although a slight deceleration, negligible in effect according to well known criteria, might be allowed on one or more walls, it is preferable to design the walls as disclosed with at least constant velocity. The term "substantially" in the claims is intended to include such a permissible deviation. It is therefore to be understood that, within the scope of the appended claims, the invention may be practiced otherwise than as specifically described.

We claim:
1. A fluidynamic diffuser for a flowing fluid comprising:
 a walled passage confining the moving fluid,
 said passage increasing in flow cross-section from an upstream portion through a convex curved wall transition portion having at least one lobe to a connected larger straight wall downstream portion,
 bleed duct means in and forming an integral part of the transition portion for removing a predetermined amount of fluid therethrough,
 said wall portion, having said lobe, merging in a smooth curve from the upstream portion into said bleed duct means, and
 all surfaces in contact with said fluid being formed so as to have substantially not less than constant fluid velocity at the edge of the fluid boundary layer.

2. Apparatus as described in claim 1 wherein the bled fluid is reintroduced into the fluid flow at another location.

3. Apparatus as described in claim 1 wherein the bled fluid is reintroduced into the fluid flow upstream of the bleed means.

4. Apparatus as described in claim 1 wherein the axis of the bleed duct makes a predetermined angle of between 0 degrees and 360 degrees with the straight wall downstream portion.

5. Apparatus as described in claim 1 wherein the bled fluid is reintroduced into the fluid flow in the transition portion.

6. Apparatus as described in claim 1 wherein the axis of the bleed duct is parallel to the straight wall downstream portion.

7. Apparatus as described in claim 1 wherein the axis of the bleed duct is parallel to the straight wall portion and the bleed duct forms a continuation of the straight wall downstream portion.

References Cited by the Examiner

UNITED STATES PATENTS

| 2,408,632 | 10/46 | Griffith | 244—40 |
|---|---|---|---|
| 2,721,715 | 10/55 | Hoadley | 244—130 |
| 2,788,719 | 4/57 | Bennett | 137—599 XR |
| 2,841,182 | 7/58 | Scala | 138—37 |
| 2,968,921 | 1/61 | David | 239—455 X |
| 3,000,178 | 9/61 | Logerot | 239—455 X |

FOREIGN PATENTS

| 969,293 | 5/50 | France. |
| 1,006,146 | 1/52 | France. |
| 141,488 | 3/61 | Russia. |

OTHER REFERENCES

Prandtl and Tietjens, Applied Hydro and Aeromechanics, pp. 58–81, 152–156, and 294, McGraw-Hill Book Co., 1934, copy in Patent Office Scientific Library, Code QA 911 T 5 REV. 2.

M. CARY NELSON, *Primary Examiner.*